US011615554B2

(12) United States Patent
Zlotnick

(10) Patent No.: US 11,615,554 B2
(45) Date of Patent: *Mar. 28, 2023

(54) OBJECT ORIENTED IMAGE NORMALIZATION

(71) Applicant: International Business Machines Corporation, Armonk, NY (US)

(72) Inventor: Aviad Zlotnick, Mitzpeh Netofah (IL)

(73) Assignee: International Business Machines Corporation, Armonk, NY (US)

(*) Notice: Subject to any disclaimer, the term of this patent is extended or adjusted under 35 U.S.C. 154(b) by 108 days.

This patent is subject to a terminal disclaimer.

(21) Appl. No.: 17/104,630

(22) Filed: Nov. 25, 2020

(65) Prior Publication Data

US 2021/0150763 A1 May 20, 2021

Related U.S. Application Data

(63) Continuation of application No. 16/204,407, filed on Nov. 29, 2018, now Pat. No. 10,878,596.

(51) Int. Cl.
*G06T 7/00* (2017.01)
*G06T 7/90* (2017.01)
(Continued)

(52) U.S. Cl.
CPC ............... *G06T 7/90* (2017.01); *G06T 7/136* (2017.01); *G09G 5/028* (2013.01); *G06T 2207/10024* (2013.01)

(58) Field of Classification Search
CPC . G06T 7/11; G06T 7/136; G06T 2207/30068; G06T 7/194; G06K 9/38
See application file for complete search history.

(56) References Cited

U.S. PATENT DOCUMENTS 6,351,566 B1   2/2002  Zlotnick
6,522,784 B1 * 2/2003  Zlotnick ............... G06T 9/005
                                                    382/233
(Continued)

FOREIGN PATENT DOCUMENTS

CA          2744690 C        6/2009

OTHER PUBLICATIONS

Zahara, Erwie, Shu-Kai S. Fan, and Du-Ming Tsai. "Optimal multi-thresholding using a hybrid optimization approach." Pattern Recognition Letters 26.8 (2005): 1082-1095.*

(Continued)

*Primary Examiner* — Li Liu
(74) *Attorney, Agent, or Firm* — Nathan M. Rau

(57) ABSTRACT

A method and system for reducing the number of colors per pixel present in an image to increase the ability to detect objects or anomalies in the image. A final number of colors per pixel to reduce the image to is determined, wherein the final number of colors is a number of colors less than the number of colors per pixel in the original image. A corresponding threshold value for each of the final number of colors is identified, such that the corresponding threshold values optimize an arithmetic combination of separation score functions applied to the plurality of pixels and the threshold values. The image is reduced to the final number of colors per pixel, by creating an output image where a value of each output pixel is equal to the number of threshold values that are less than the value of the corresponding input pixel.

15 Claims, 5 Drawing Sheets

(51) Int. Cl.
  *G09G 5/02* (2006.01)
  *G06T 7/136* (2017.01)

(56) References Cited

U.S. PATENT DOCUMENTS

| | | | |
|---|---|---|---|
| 6,728,426 B1* | 4/2004 | Zlotnick | G06T 5/005 |
| | | | 375/E7.193 |
| 7,315,398 B2* | 1/2008 | Mantell | H04N 1/4052 |
| | | | 358/3.05 |
| 8,351,720 B2 | 1/2013 | Majewicz | |
| 8,406,554 B1 | 3/2013 | Saha | |
| 2006/0280352 A1 | 12/2006 | Muschler | |
| 2007/0047793 A1 | 3/2007 | Wu | |
| 2013/0187867 A1* | 7/2013 | Chen | G06F 3/0425 |
| | | | 345/173 |
| 2015/0146261 A1 | 5/2015 | Subbaian | |
| 2016/0027162 A1 | 1/2016 | Spitzer | |
| 2016/0078630 A1 | 3/2016 | Steinberg | |
| 2017/0103519 A1 | 4/2017 | Zlotnick | |
| 2019/0331301 A1 | 10/2019 | Du | |

OTHER PUBLICATIONS

Banimelhem et al., "Multi-Thresholding Image Segmentation Using Genetic Algorithm," Apr. 2012, 7 pages, https://www.researchgate.net/publication/266225764_Multi-Thresholding_Image_Segmentation_Using_Genetic_Algorithm.

Brink et al., "Minimum Cross-entropy Threshold Selection," Patter Recognition, 29.1 (1996): 179-188.

Cuevas et al., "A Multi-threshold Segmentation Approach Based on Artificial Bee Colony Optimization," Applied Intelligence 37 (3), 2012, pp. 321-336.

Han et al., "A multi-threshold image segmentation approach using state transition algorithm," Proceedings of the 34th Chinese Control Conference, Jul. 2015, pp. 2662-2666.

Kittler et al., "Threshold Selection Based on a Simple Image Statistic," Computer Vision, Graphics, and Image Processing, 30.2 (1985): 125-147.

List of IBM Patents or Applications Treated as Related.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

Osuna-Enciso et al., "A Comparison of Nature Inspired Algorithms for Multi-threshold Image Segmentation," Cornel University Libarary, Computer Science, draft of article sent to the Journal (Expert Systems with Applications, vol. 40, Issue 4, Mar. 2013), 16 pages arXiv:1405.7406v1.

Otsu, N., "A Threshold Selection Method from Gray-level Histograms," IEEE Transactions on Systems, Man, and Cybernetics, 9.1 (1979): 62-66.

* cited by examiner

OBJECT ORIENTED IMAGE NORMALIZATION

BACKGROUND

The present disclosure relates to image processing, more specifically to reducing the number of colors in an image while enhancing the ability to identify objects within the image.

Digital images contain a digitally encoded representation of the visual characteristics of an object or objects. The digital image is made up of a number of pixels that represent the various colors that are present in the image. Each pixel contains a number of bits. The number of bits present in a pixel controls the number of colors that can be displayed. The more bits present in a pixel means that more colors can be displayed. However, having too many colors in an image can sometimes cause difficulties.

SUMMARY

Embodiments of the present disclosure are directed to a method and system for reducing the number of colors per pixel present in an image to increase the ability to detect objects or anomalies in the image. A final number of colors per pixel to reduce the image to is determined, wherein the final number of colors is a number of colors less than the number of colors per pixel in the original image. A corresponding threshold value for each of the final number of colors is identified, such that the corresponding threshold values optimize an arithmetic combination of separation score functions applied to the plurality of pixels and the threshold values. In some embodiments, the separation score functions are monotonically increasing with a number of transitions and monotonically decreasing with a number of expected transitions had the plurality of pixels been randomly distributed in the image. In some embodiments, the arithmetic combination is a sum of the separation score function for each of the corresponding threshold values. Then the image is reduced from the first number of colors per pixel to the final number of colors per pixel, by creating an output image where a value of each output pixel is equal to the number of threshold values that are less than the value of the corresponding input pixel. In some embodiments, the image can be reduced from the original image to an intermediate image prior to reducing the image to final number of colors per pixel.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
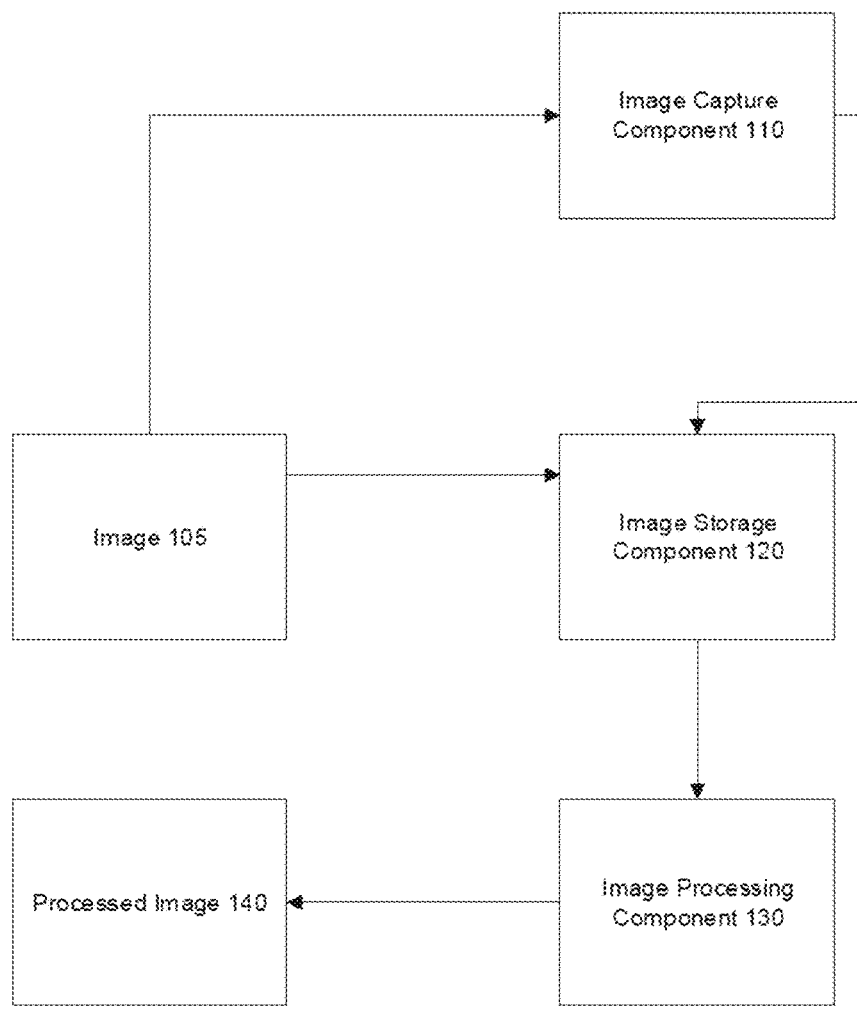
FIG. 1 is a block diagram illustrating a system to identify a threshold that optimizes the sum of two-level separation scores for consecutive blocks in a gray level co-occurrence matrix, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relates to image processing, more specifically to reducing the number of colors in an image while enhancing the ability to identify objects within the image. While the present disclosure is not necessarily limited to such applications, various aspects of the disclosure may be appreciated through a discussion of various examples using this context.

Mammography images from different patients and from different sources have different distributions of pixel values. This impacts the ability to analyze these images, regardless if the analysis is performed using neural networks or computer vision methods. Attempts to normalize images using the pixel value histogram did not result in a significant improvement in the overall ability to analyze these images. It was concluded that the histogram alone does not capture enough of the image properties to achieve good results. It should be noted that if one takes an image and mixes its pixels randomly, the image content is totally lost, but the gray level histogram is not affected. The present disclosure provides an approach that combines spatial information with the gray level distribution.

FIG. 1 is a block diagram illustrating a system 100 to identify a threshold that optimizes the sum of two-level separation scores for consecutive blocks in a gray level co-occurrence matrix. System 100 includes an image capture component 110, an image storage component 120 and an image processing component 130. System 100 processes the gray level co-occurrence matrix instead of the gray level value histogram.

Image capture component 110 is a component of the system 100 that is configured to capture an image 105. The image can be, for example, a medical image, such as a mammogram, x-ray, MRI, CT scan image, etc. However, other types of images can be created. Typically, these images are generated in black and white. By black and white it is not meant to imply the only two colors present are black and white, but that each pixel can be a portion of only black or white, i.e. multiple different shades of gray. Typically, these images are in either 16 or 12 bits. These images provide information to a professional that can be used to make, for example, a diagnosis of a specific condition that is present in a patient from whom the image was taken. The image can be captured from a corresponding device that is capable of producing the image. For example, the image can be created from a camera, an X-ray machine, an MRI machine, a Full Field Digital Mammography (FFDM) machine, etc.

The image 105 can be represented by a matrix, where each pixel in the image is represented by an entry in the matrix. The color of the pixel is represented by a value in the matrix. This value is used by a display device to determine how to render the particular image and the particular pixel, and used by software to analyze the contents of the particular image. Images can be monochrome, meaning only black and white. An image can be rendered in grayscale, meaning only the intensity of the light is considered, rendering an image in only variations of gray. Typically, black would have the lowest value of light intensity and white would have the highest level of light intensity. Grays would be rendered in between each gray having its own light intensity. The number of bits that are present in a pixel defines the maximal number of "shades of gray" that are available to the system 100 to use to produce an image. Typical medical imaging uses 12-bit grayscale.

The image storage component 120 is a component of the system 100 that stores or holds the images. These images can either be the "raw" images (e.g. the images from the image capture component 110) or "processed" images (e.g. images that are processed by the image processing component 130). The images are stored in the image storage component 120 in a format that permits the retrieval and subsequent display of the images to a professional.

The image processing component 130 is a component of the system 100 that is configured to process the raw image from the image capture component 110 and normalize the image by reducing the number of gray levels that are present in the image. The image processing component 130 can reduce an image from any number of existing gray levels down to a binary image. In a binary image, only black and only white pixels are present in the image. However, in other embodiments, the image processing component 130 can reduce the number of colors to a value that is greater than two. To process the image the image processing component 130 determines specific thresholds (two or more) between which a particular pixel in the image is determined to be, for example, a first threshold between "black" and "gray" and a second threshold between "gray" and "white". The number of thresholds that are computed is one less than the number of gray levels required in the processed image. The case of two neighboring pixels that have a threshold between their values is referred to as a "transition". In some embodiments of the present disclosure, all but transitions between neighboring pixels that have exactly one threshold between their values are ignored. The image processing component 130 during the processing optimizes the number of transitions between black pixels and white pixels, or in the case of multiple different shades of gray minimizes the number of transitions between each of the colors. To achieve this the image processing component 130 uses threshold values to determine what color gray the particular pixel should be.

First the discussion will address the process where only two colors are required in the output image, so there is only one threshold present. For any threshold t, where $0 \le t < N$, let B(t) be the number of pixels whose value is less than t. Where t is representative of the threshold light intensity required for the particular pixel to have a particular color. Let W(t) be the number of pixels whose value is $\ge t$. Let BW(t) be the number of pixels whose value is less than t and whose right hand neighboring pixel in the image has a value that is $\ge t$. Let WB(t) be the number of pixels whose value is $\ge t$ and whose right hand neighboring pixel in the image has a value that is $< t$.

Further, let M equal the number of pixels in the image. Let p(t) equal the probability of a pixel being $\ge t$, that is p(t)=W(t)/M. Let q(t) equal the probability of a pixel being $< t$, that is q(t)=1-p(t)

In an image that had random distribution of pixels, the expectation would be that BW(t)+WB(t) would be eBW or WB(t)=M*p*q+M*q*p=2*M*p*q. The less random an image is, that is the less random the arrangement of the pixels is, the smaller a score is that considers the random distribution of pixels. This separation score for each threshold can be represented by S(t)=BW(t)+WB(t)-eBW or BW(t).

The reasoning behind this kind of score function is that the farther an image is from random, the better objects in the image can be detected. Thus, the image processing component 130 attempts to set the threshold t such that argmin(t) of S(t) is achieved.

The discussion will now address the process where more than two colors are required in the output image, so there is more than one threshold present.

In some embodiments, the image processing component 130 processes the image to produce an output image with more than just black and white. For example, the image can be converted from 16 bit image to a 3 gray level image. In this embodiment, the image is reduced to three colors: black, gray, and white. However, the reduction can be made to any number of fewer colors than are present in the image. Regardless of the number of colors that are to remain in the image following the processing, the approach is similar.

The image processing component 130 can determine the number of pixel values that it will need. This number of values is represented by V. The image processing component 130 determines the optimal threshold values for each of the transitions between each of the colors that are going to remain in the image following the processing. The number of thresholds for any reduction is V−1. So, for a 3-color final image, there are two thresholds, one between black and gray, and a second one between gray and white. The thresholds to be found can be represented as $0=t(0)<t(1)< \ldots <t(V)=$ maxVal+1. Where each value of t represents a transition between a color, and where maxVal is the maximum pixel value in the image.

It should be recognized that any change of one threshold value in the chain of thresholds values influences the separation scores associated with other threshold values because it changes the number of pixels associated with each side of the prior threshold value. Similar to the above example with just two colors, with multiple colors the image processing component 130 attempts to find the minimal sum of separation scores for all of the thresholds. This can be represented by the following equations. $S(t_{i-1}, t_i, t_{i+1})$ is the separation score between the pixels whose values are between $t_{i-1}$ and $t_i$ and the pixels whose values are between $t_i$ and $t_{i+1}$. Linear programming, such as Belmann's algorithm, is applied to optimize the series of thresholds such that $\Sigma S(t_{i-1}, t_i, t_{i+1})$ for $0 < i <$ maxVal is minimized. That is, the sum $S(t_0,t_1,t_2)+S(t_1,t_2,t_3)+S(t_{n-2},t_{n-1},t_n)$ is as small as possible.

The image processing component 130 performs the optimization process by finding a required number of thresholds such that the selected threshold values minimize the sum of a separation scoring function applied to the image pixels that are separated by each threshold, and only by that threshold. So, for example, if the thresholds are 10.5 and 20.5, then the sum of the scoring function applied to image pixels whose values are 0:10 and 11:20 and the scoring function applied to image pixels whose values are 11:20 and 21:Nis minimized, where Nis the number of gray levels in the image. Optimization can be performed using any optimization algorithm, for example, Simulated Annealing, Genetic Algorithm, and Linear Programming.

The scoring function accepts two groups of pixels. All the pixels in the first group have values below the corresponding threshold, and all the pixels in the second group have values above that threshold. A pixel from the one group that is a neighbor of a pixel from the other group is considered a transition. In one embodiment, the process looks at the right hand neighboring pixel. However, in other embodiments, a different neighboring pixel can be considered, such as a left hand neighboring pixel, a top neighboring pixel, a bottom neighboring pixel, etc., or any combination thereof. The computed return value of the function is monotonically increasing with the number of transitions observed in the two groups of image pixels provided to the function, and monotonically decreasing with the number of transitions expected had these pixels been randomly arranged spatially in the image.

The number of transitions expected in a random spatial arrangement of the input groups is calculated as follows: Let M be the number of pixels in the image, L be the number of pixels in the first group, H be the number of pixels in the second group, p be the probability that a pixel is in the first group, and q be the probability that a pixels is in the second group.

Then p=L/M and q=H/M. L*q is the number of second group pixels that are expected to be neighbors of a pixel in the first group, and H*p is the number of pixels of the first group that are expected to be neighbors of a pixel in the second group. The expected number of transition in a random spatial arrangement of the pixels of the two groups is, therefore, L*H/M+H*L/N, i.e., 2*H*L/M. In other embodiments p=L/(L+H) and q+H/(L+H).

An exemplary scoring function for multiple thresholds is S(t)=sqrt(K)-sqrt(2*H*L/M), where K is the number of observed transitions. As mentioned above, the reasoning behind this kind of score function is that the farther an image is from random, the better objects in the image can be detected. Thus, the image processing component 130 when addressing multiple thresholds attempts to set the threshold t such that argmin(t) of the sum of S(t) is achieved. In this case, t consists of multiple thresholds, as associated with the desired output.

Applying the above analysis to the image, the image processing component 130 steps through each pixel in the image and determines the closest threshold value that has a value that is lower than the pixel value. The pixel value is then replaced by that number. This results in the creation of a modified image 140. In some embodiments the image processing component 130 can determine the closest threshold value that has a value that is higher than the pixel value, and change the pixel value to match that value.

In some embodiments, the image processing component 130 can improve the performance of the conversion process. In one embodiment the performance is improved by executing a subsampling of the pixels in the image. In this embodiment, the image processing component 130 would only sample some of the pixels. For example, sampling every tenth pixel. In another embodiment, the image processing component 130 improves performance, by not analyzing empty rows/columns that appear in the gray scale matrix.

In yet another embodiment, the image processing component 130 can improve the performance of the processing by performing an intermediate reduction in the number of bits in the image. For example, if the desire was to go from a 16 bit image to a 3 bit image, the image processing component 130 can first reduce the image from 16 bit to 8 bit. Once the image was reduced down to 8 bit, the image processing component 130 can further reduce the image from 8 bit to 3 bit. By using an intermediate image in the processing, the processing of the image can be done faster and more accurately than it would be by simply going from 16 bit to 3 bit. It should be recognized that any number of intermediate reductions can be used, and the level of reduction can also be different.

In another embodiment, the image processing component 130 can improve performance by constraining the distance between threshold values. For example, if the image has 256 pixel values, and is to be reduced to 8 pixel values, the image processing component can constrain the threshold values to a distance of at least 2 values and at most 64 values from each other.

Figure 2:
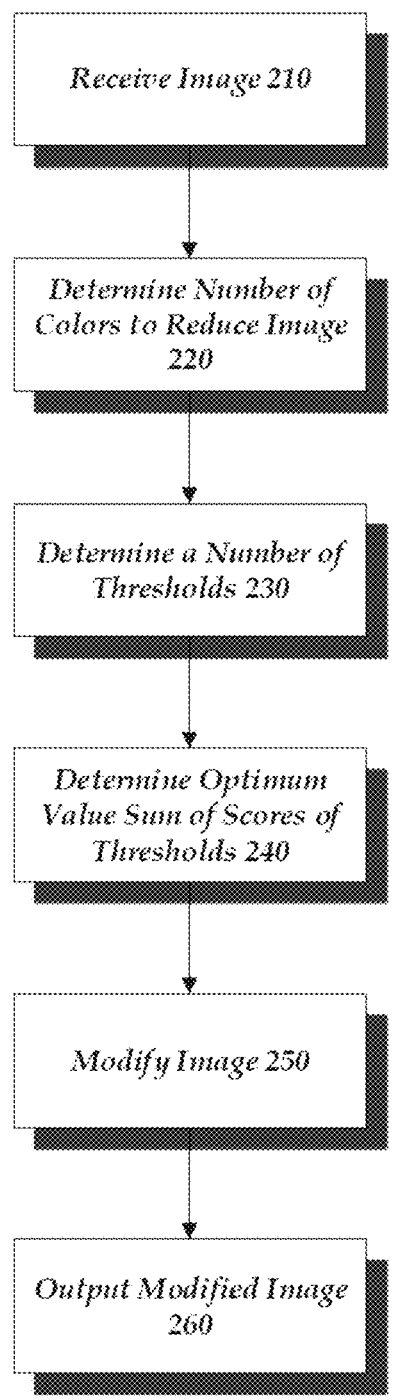
FIG. 2 is a flow diagram illustrating a process for reducing the number of colors in an image. according to embodiments.

FIG. 2 is a flow diagram illustrating a process 200 for reducing the number of colors in an image according to illustrative embodiments. Process 200 begins by receiving an image. This is illustrated at step 210. The image that is received is an image for which a reduction in the number of bits in the image is desired. The image can be in grayscale or in color. The image can be of any object and can be any type of image, for example a medical image generated by a medical imaging device. The image can be received directly from the device that generated the image, or can be received from the image storage component 120. Further, the image can be represented by a matrix. In the matrix each pixel is represented by a value indicative of the color of the pixel. This value is used by a display device to determine how to render the particular image and the particular pixel. Again, images can be monochrome, meaning only black and white. An image can be rendered in grayscale, meaning only the intensity of the light is considered, rendering an image in only variations of gray. Black would have the lowest value of light intensity and white would have the highest level of light intensity. Grays would be rendered in between each gray having its own light intensity. The number of bits that are present in an pixel represents the number of "shades of gray" that are available to the system 100 to use to produce an image.

Once the image has been received the processing of the image can begin. The system 100 determines the number of bits that the image will be reduced to. This is illustrated at step 220. The system 100 can receive an input from the user indicating the number of bits that the user wishes the image to be reduced to. However, in other embodiments, the system 100 can be pre-programmed to determine the number of bits to reduce the image to. In some embodiments the system 100 can determine at this stage to perform a stepped reduction of the image. In this approach, the image processing component 130 reduces the image in a staged approach. The image is reduced from the original image to at least one intermediate image prior to arriving at the desired reduced image. For example, a 16 bit image that is desired to be a 3 bit image, can first be reduced to an 8 bit image and then from the 8 bit image to the 3 bit image. However, any number of intermediate images can be created during the reduction process.

Once the number of colors that the image is to be reduced to is determined, the process then determines a number of threshold values for the bits. This is illustrated at step 230. The number of threshold values determined is the number of colors desired minus 1. So for a 3 color image there are two thresholds, for 8 colors there are seven thresholds, and so forth.

Given the number of thresholds that are needed, the process continues to determine the thresholds that result in an optimum value for the sum of the separation scores of the thresholds. This is illustrated at step 240. For any threshold the threshold is representative of the threshold light intensity required for the particular pixel to have a particular color. A separation score for each of the thresholds is calculated. An optimization is applied such that the selected threshold values minimize the sum of a separation scoring function applied to the image pixels that are separated by each threshold, and only by that threshold.

Once the threshold for each of the colors has been determined the image processing component 130 proceeds to modify the image accordingly. This is illustrated at step 250. The image processing unit compares the value of the pixel in the original image with the threshold values for the colors. When the value of the pixel does not meet the next highest threshold level, the color of that pixel is changed to the color associated with the threshold level below it.

Once all of the pixels in the image have been processed using the thresholds, the resultant modified image is output. This is illustrated at step 260. This output can be to the image storage component 120 and/or a display device. In some embodiments, the image can be transmitted to another location for review and/or storage at a remote location.

Figure 3:
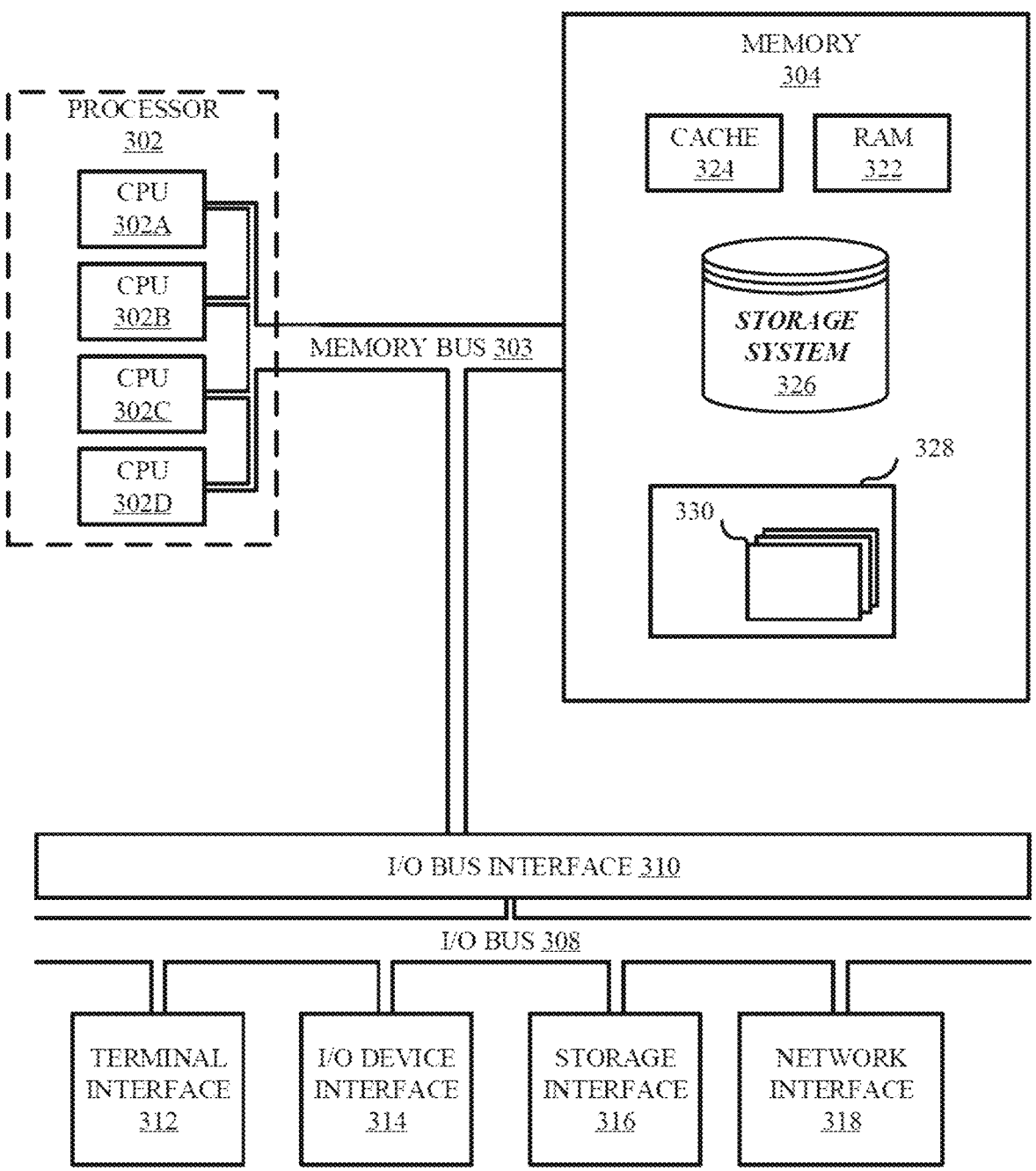
FIG. 3 is a block diagram illustrating a computing system according to one embodiment.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
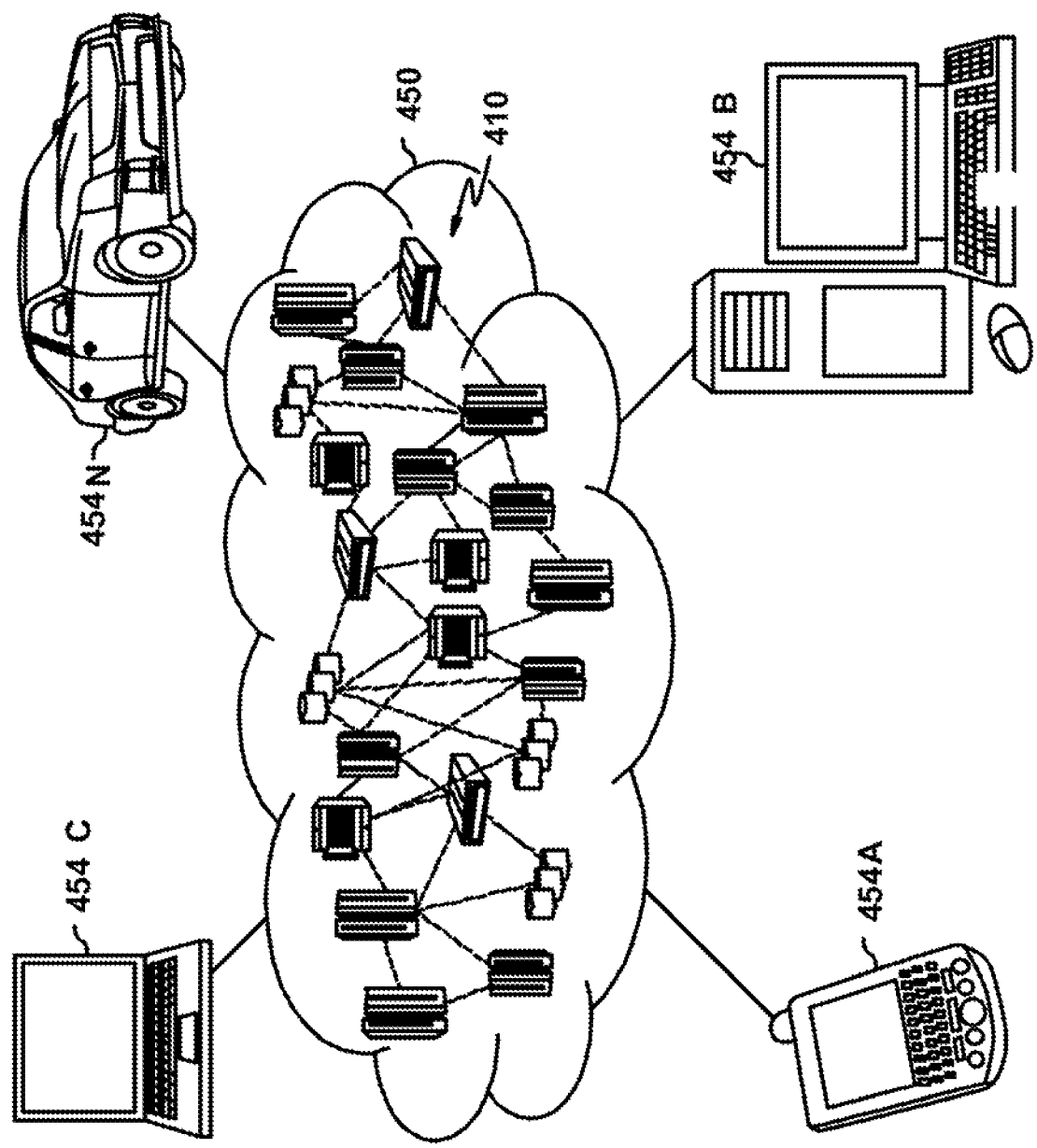
FIG. 4 is a diagrammatic representation of an illustrative cloud computing environment.

The application 180 may be employed in a cloud computing environment. Further, both the testing tool 110 and the monitoring tool 150 may also be employed in a cloud computing environment. FIG. 4, is a diagrammatic representation of an illustrative cloud computing environment 450 according to one embodiment. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 10 and cloud computing environment 450 may communicate with any type of computerized device over any type of network and/or network addressable connection (e.g., using a web browser).

Figure 5:
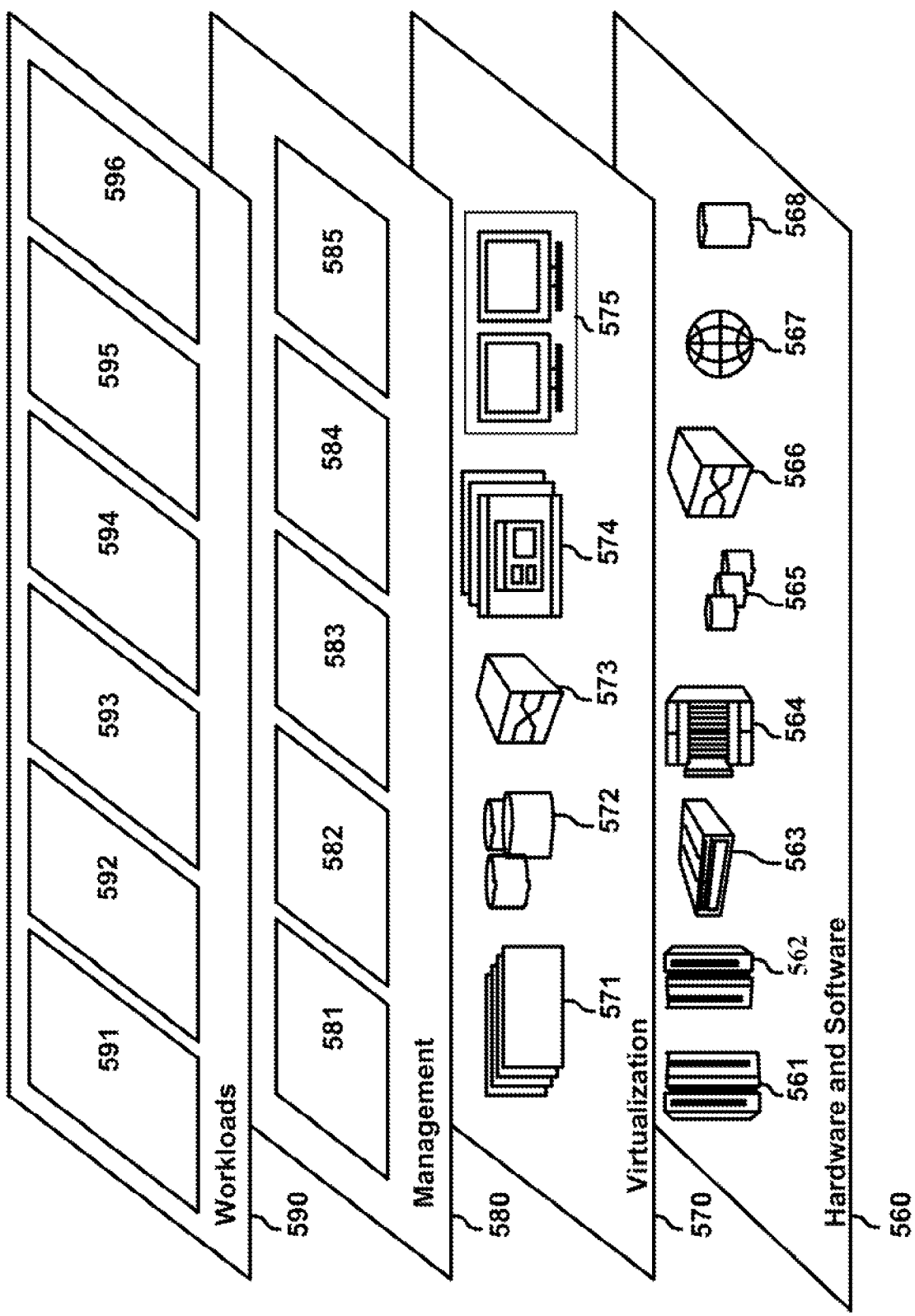
FIG. 5 illustrates a set of functional abstraction layers provided by cloud computing environment according to one illustrative embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and database 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer readable storage medium having computer readable instructions, that when executed by at least one computer cause the at least one computer to perform a method for reducing a first number of colors per pixel in an image, comprising instructions to:
   receive the image, the image having a plurality of pixels;
   determine a final number of colors per pixel to reduce the image to;
   identify a corresponding threshold value at which a pixel in the image is determined to be a particular color, wherein the identifying, identifies a plurality of threshold values, wherein each threshold value represents a color in the reduced image, wherein identifying the corresponding threshold value for each of the plurality of threshold values comprises:
   selecting a first threshold value;
   determine a first number of pixels in the image that have a value less than the first threshold, and has a neighboring pixel that has a value greater than the first threshold;
   determine a second number of pixels in the image that have a value greater than the first threshold, and has a neighboring pixel that has a value less than the first threshold;
   determine a first probability that any pixel in the plurality of pixels has a value greater than the first threshold;
   determine a second probability that any pixel in the plurality of pixels has a value less than the first threshold; and
   determine a separation score for the first threshold wherein the separation score is the sum of the first number and the second number minus the product of two times a number of the plurality of pixels in the image, the first probability, and the second probability;
   determine an argument of the minimum for a sum of the separation scores for each of the plurality of thresholds, wherein each of the separation scores represent a separation score between one threshold value and a next threshold value that is a next highest threshold value of the plurality of threshold values;
   set as the corresponding threshold for each of the plurality of thresholds the corresponding first threshold resulting in the argument of the minimum of the sum of the separation scores; and
   modify the image to have the final number of colors per pixel, by changing the value of the plurality of pixels based on the corresponding threshold, where pixels having a value below the corresponding threshold are modified to a value associated with a corresponding first color, and pixels having a value above than the corresponding threshold are modified to a value associated with a corresponding second color.

2. The computer readable storage medium of claim 1 further comprising instructions to:
   determine an intermediate number of colors per pixel to reduce the image to, wherein the intermediate number of bits is a number of bits between the first number of colors and the final number of colors;
   modify the image to have the intermediate number of colors per pixel, by changing the value of the plurality of pixels based on an intermediate threshold, where pixels having a value above the intermediate threshold are modified to a value associated with a first color, and pixels having a value less than the intermediate threshold are modified to a value associated with a second color; and
   wherein instructions to modify the image to have the intermediate number of colors per pixel is performed prior to modifying the image to have the final number of colors per pixel.

3. The computer readable storage medium of claim 2 wherein instructions to modify the image to have the final number of colors per pixel, modifies the image from an intermediate image having the intermediate number of colors per pixel.

4. The computer readable storage medium of claim 2 wherein the intermediate threshold is identified by instructions to:
   select a second threshold value;
   determine a third number of pixels in the image that have a value greater than the second threshold, and has a neighboring pixel that has a value greater than the second threshold;
   determine a fourth number of pixels in the image that have a value greater than the second threshold, and has a neighboring pixel that has a value less than the second threshold;
   determine a third probability that any pixel in the plurality of pixels has a value greater than the second threshold;
   determine a fourth probability that any pixel in the plurality of pixels has a value less than the second threshold;
   determine a second separation score for the second threshold wherein the second separation score is the sum of the third number and the fourth number minus the product of two times the plurality of pixels and the third probability and the fourth probability;
   determine the argument of the minimum for the second separation score; and
   set the second threshold as the intermediate threshold when the second threshold is the argument of the minimum for the second separation score.

5. The computer readable storage medium of claim 1 further comprising instructions to:
  iterate the steps associated with identifying the threshold value until the first threshold value is the argument of the minimum for the separation score; and
  modify a value of the first threshold for each iteration.

6. The computer readable storage medium of claim 1 wherein the image is in grayscale.

7. The computer readable storage medium of claim 1 wherein the neighboring pixel is to a right hand side.

8. The computer readable storage medium of claim 1 wherein the neighboring pixels is to a left hand side.

9. The computer readable storage medium of claim 1 wherein a distance between each corresponding threshold is constrained.

10. The computer readable storage medium of claim 1 wherein an amount of the plurality of threshold values is the final number of colors per pixel minus one.

11. A system for reducing a number of colors per pixel in an image, comprising:
  a processor;
  a memory device;
  wherein the processor is configured to perform the steps of:
    receiving the image, the image having a plurality of pixels;
    determining a final number of colors per pixel to reduce the image to;
    identifying a corresponding threshold value at which a pixel in the image is determined to be a particular color, wherein the identifying, identifies a plurality of threshold values, wherein each threshold value represents a color in the reduced image, wherein identifying the corresponding threshold value for each of the plurality of threshold values comprises:
      selecting a first threshold value;
      determining a first number of pixels in the image that have a value less than the first threshold, and has a neighboring pixel that has a value greater than the first threshold;
      determining a second number of pixels in the image that have a value greater than the first threshold, and has a neighboring pixel that has a value less than the first threshold;
      determining a first probability that any pixel in the plurality of pixels has a value greater than the first threshold;
      determining a second probability that any pixel in the plurality of pixels has a value less than the first threshold; and
      determining a separation score for the first threshold wherein the separation score is the sum of the first number and the second number minus the product of two times a number of the plurality of pixels in the image, the first probability, and the second probability;
    determining an argument of the minimum for a sum of the separation scores for each of the plurality of thresholds, wherein each of the separation scores represent a separation score between one threshold value and a next threshold value that is a next highest threshold value of the plurality of threshold values;
    setting as the corresponding threshold for each of the plurality of thresholds the corresponding first threshold resulting in the argument of the minimum of the sum of the separation scores; and
    modifying the image to have the final number of colors per pixel, by changing the value of the plurality of pixels based on the corresponding threshold, where pixels having a value below the corresponding threshold are modified to a value associated with a corresponding first color, and pixels having a value above than the corresponding threshold are modified to a value associated with a corresponding second color.

12. The system of claim 11 wherein the processor is further configured to perform the steps of:
  iterating the steps associated with identifying the threshold value until the first threshold value is the argument of the minimum for the separation score; and
  modifying a value of the first threshold for each iteration.

13. The system of claim 11, wherein the image is in grayscale.

14. The system of claim 11 wherein a distance between each corresponding threshold is constrained.

15. The system of claim 11, wherein the processor is further configured to perform the steps of
  determining an intermediate number of colors per pixel to reduce the image to, wherein the intermediate number of bits is a number of bits between the first number of colors and the final number of colors;
  modifying the image to have the intermediate number of colors per pixel, by changing the value of the plurality of pixels based on an intermediate threshold, where pixels having a value above the intermediate threshold are modified to a value associated with a first color, and pixels having a value less than the intermediate threshold are modified to a value associated with a second color;
  wherein modifying the image to have the intermediate number of colors per pixel is performed prior to modifying the image to have the final number of colors per pixel; and
  wherein modifying the image to have the final number of colors per pixel, modifies the image from an intermediate image having the intermediate number of colors per pixel.

* * * * *